United States Patent
Immel et al.

(10) Patent No.: US 11,020,690 B2
(45) Date of Patent: *Jun. 1, 2021

(54) 3D PRINTED FILTER CENTER TUBE

(71) Applicant: Caterpillar Inc., Deerfield, IL (US)

(72) Inventors: Jon Tyler Immel, Chillicothe, IL (US); Javier A. Rodriguez, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 164 days.

This patent is subject to a terminal disclaimer.

(21) Appl. No.: 16/211,395

(22) Filed: Dec. 6, 2018

(65) Prior Publication Data
US 2020/0179836 A1 Jun. 11, 2020

(51) Int. Cl.
*B01D 29/33* (2006.01)
*B01D 39/16* (2006.01)
(Continued)

(52) U.S. Cl.
CPC .......... *B01D 29/15* (2013.01); *B01D 29/016* (2013.01); *B01D 29/031* (2013.01); *B01D 29/33* (2013.01);
(Continued)

(58) Field of Classification Search
CPC ...... B01D 25/00; B01D 25/001; B01D 25/04; B01D 25/08; B01D 27/00; B01D 27/005; B01D 27/04; B01D 27/06; B01D 27/08; B01D 27/146; B01D 27/148; B01D 29/00; B01D 29/0002; B01D 29/0004; B01D 29/0018; B01D 29/0022; B01D 29/0093; B01D 29/0095; B01D 29/01; B01D 29/012; B01D 29/016; B01D 29/03; B01D 29/031; B01D 29/05; B01D 29/07; B01D 29/15; B01D 29/44; B01D 29/46; B01D 29/50; B01D 29/56; B01D 29/58; B01D 35/00; B01D 35/005; B01D 35/30; B01D 35/301; B01D 39/00; B01D 39/10; B01D 39/12; B01D 39/14; B01D 39/16; B01D 39/1692; B01D 39/58; B01D 46/00; B01D 46/0001; B01D 46/0002; B01D 46/0004;
(Continued)

(56) References Cited

U.S. PATENT DOCUMENTS 5,476,588 A * 12/1995 Nagaoka .............. B01D 29/012
210/499
2015/0259219 A1 9/2015 Summers et al.
(Continued)

FOREIGN PATENT DOCUMENTS

CN 203620429 6/2014
CN 108568160 9/2018
(Continued)

*Primary Examiner* — Clare M Perrin
(74) *Attorney, Agent, or Firm* — Law Office of Kurt J. Fugman LLC

(57) ABSTRACT

A filter center tube includes a plurality of layers of solidified material including a first layer with a first undulating strip of solidified material extending in a first predetermined direction, and a second layer with a second undulating strip of solidified material extending in a second predetermined direction. The first layer is in contact with the second layer and the first predetermined direction is not parallel with the second predetermined direction, forming a plurality of pores therebetween.

5 Claims, 5 Drawing Sheets

(51) Int. Cl.
*B01D 46/00* (2006.01)
*B01D 29/15* (2006.01)
*B01D 29/03* (2006.01)
*B01D 29/01* (2006.01)
B01D 29/11 (2006.01)
B33Y 80/00 (2015.01)
B33Y 10/00 (2015.01)
B01D 29/00 (2006.01)

(52) U.S. Cl.
CPC ......... *B01D 39/16* (2013.01); *B01D 39/1692* (2013.01); *B01D 46/0002* (2013.01); *B01D 29/0018* (2013.01); *B01D 29/111* (2013.01); *B33Y 10/00* (2014.12); *B33Y 80/00* (2014.12)

(58) Field of Classification Search
CPC ............ B01D 46/0005; B01D 46/0012; B01D 46/0016; B01D 46/0019; B01D 46/0039; B01D 46/0041; B01D 46/0047; B01D 46/0049; B01D 46/005; B01D 46/40; B01D 46/406; B01D 46/52; B01D 46/521; B01D 46/528; B01D 46/54; B01D 46/543; B01D 46/546; B01D 63/00; B01D 63/08; B01D 63/081; B01D 63/082; B01D 67/00; B01D 67/0002; B01D 67/0004; B01D 67/002; B01D 67/0037; B01D 67/0006; B01D 67/0081; B01D 67/00088; B01D 69/00; B01D 69/06; B01D 69/10; B01D 69/12; B01D 69/122; B01D 69/125; B01D 71/00; B01D 2201/00; B01D 2201/18; B01D 2201/29; B01D 2201/30; B01D 2201/301; B01D 2201/307; B01D 2201/31; B01D 2265/00; B01D 2265/02; B01D 2265/06; B01D 2267/00; B01D 2267/30; B01D 2267/60; B01D 2267/70; B01D 2275/00; B01D 2275/10; B01D 2275/20; B01D 2275/205; B01D 2275/206; B01D 2313/00; B01D 2313/08; B01D 2313/086; B01D 2313/20; B01D 2319/00; B01D 2319/02; B01D 2201/182; B01D 2201/302; B01D 2325/02; B01D 2325/08; B33Y 80/00; Y10T 428/24025; Y10T 428/24174

See application file for complete search history.

(56) References Cited

U.S. PATENT DOCUMENTS

| | | |
|---|---|---|
| 2016/0038866 A1 | 2/2016 | Gibson et al. |
| 2016/0107106 A1 | 4/2016 | Brown |
| 2017/0216742 A1 | 8/2017 | Prine et al. |
| 2017/0341003 A1 | 11/2017 | Smith et al. |
| 2018/0001236 A1 | 1/2018 | Marchione et al. |
| 2018/0200650 A1 | 7/2018 | Salsburey et al. |

FOREIGN PATENT DOCUMENTS

| | | | |
|---|---|---|---|
| DE | 102014009324 | 12/2015 | |
| WO | 2016106179 | 6/2016 | |
| WO | 2016133929 | 8/2016 | |
| WO | WO-2016189291 A1 * | 12/2016 | .......... B01J 20/3475 |
| WO | 2019202438 | 10/2019 | |
| WO | 2020023168 | 1/2020 | |

\* cited by examiner

3D PRINTED FILTER CENTER TUBE

TECHNICAL FIELD

The present disclosure relates to filters and breathers used to remove contaminants various fluids such as hydraulic fluid, air filtration, oil, and fuel, etc. used to power the mechanisms and engines of earth moving, construction and mining equipment and the like (e.g. automotive, agriculture, HVAC (heating, ventilation and air conditioning), locomotive, marine, exhaust treatment or any other industry where filters and breathers are useful). Specifically, the present disclosure relates to filters that are manufactured using a filter center tube, which provides support to help keep the filtration media from collapsing.

BACKGROUND

Earth moving, construction and mining equipment and the like often use filters and/or breathers used to remove contaminants various fluids such as hydraulic fluid, oil, and fuel, etc. used to power the mechanisms and engines of the equipment. Over time, contaminants collect in the fluid that may be detrimental to the components of the various mechanisms (e.g. hydraulic cylinders) and the engines, necessitating repair. The goal of the filters and/or breathers is to remove the contaminants in the various fluids to prolong the useful life of these components. Any industry using filters and/or breathers may also need to remove contaminants from hydraulic fluid, air, oil, and fuel, etc. Examples of these other industries, include but are not limited to, automotive, agriculture, HVAC, locomotive, marine, exhaust treatment, etc.

The technologies typically used to provide the filter media include folding porous fabric or other materials that remove the contaminants. Filter center tubes may be employed to help prevent the fabric from collapsing. Collapsing the filter media may hinder the effectiveness of the filter to remove contaminants while allowing a sufficient flow of fluid through the filter to supply the various systems of the equipment.

The filter center tube may occupy a considerable amount of space in the interior of the filter, limiting the rate at which fluid may flow through the filter while still maintaining a desirable level of contamination removal. That is to say, the throughput of the filter may be reduced due to the center tube which only provides support and no filtering function.

SUMMARY

A filter center tube according to an embodiment of the present disclosure comprises a plurality of layers of solidified material including a first layer with a first undulating strip of solidified material extending in a first predetermined direction, and a second layer with a second undulating strip of solidified material extending in a second predetermined direction. The first layer is in contact with the second layer and the first predetermined direction is not parallel with the second predetermined direction, forming a plurality of pores therebetween.

A filter according to another embodiment of the present disclosure comprises a housing including an outer wall and an inner wall. The outer wall and the inner wall define the same longitudinal axis, the inner wall defines a radial direction that passes through the longitudinal axis and that is perpendicular thereto, and a circumferential direction that is tangential to the radial direction and perpendicular to the longitudinal direction. The inner wall is spaced radially away from the outer wall and the body further defines a first end and a second end disposed along the longitudinal axis and a hollow interior. An inlet is in fluid communication with the hollow interior and an outlet is in fluid communication with the hollow interior. A filter center tube may be disposed in the hollow interior comprising a plurality of layers, wherein each layer includes an undulating strip of solidified material.

A method for manufacturing a filter center tube according to an embodiment of the present disclosure comprises providing a computer-readable three-dimensional model of the filter, the three-dimensional model being configured to be converted into a plurality of slices that each define a cross-sectional layer of the filter center tube, and successively forming each layer of the filter center tube by additive manufacturing.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Figure 1:
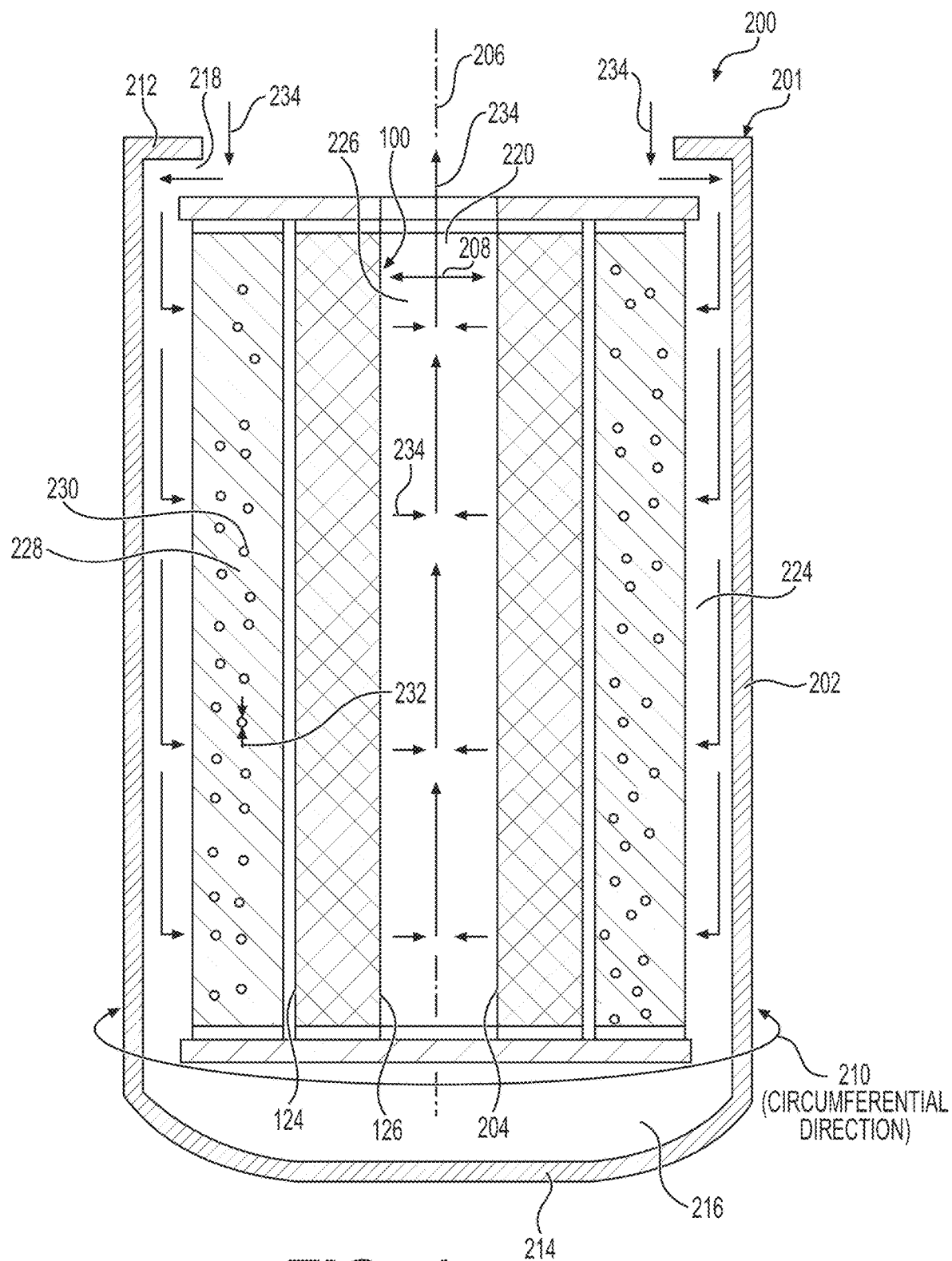
FIG. 1 is a sectional view of a filter employing a filter center tube manufactured using 3D printing or other additive manufacturing technology according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of a filter and/or filter medium will be discussed herein that utilize existing additive manufacturing technologies to implement a method to produce a repeatable process that generates porous filtration media of a useable efficiency grade. Examples of the process include FFF, FDM, SLA, etc., 3D printing hardware, and specific control of the movement patterns of the printing head so that as the material is added to the part, small gaps are created to build a porous structure. This method utilize an open source software that generates the filtration structure based on the inputs given to it by the user. The method may vary the speed and path of the print head, the flow rate of the plastic being deposited, cooling methods, etc. The structure that is laid down may droop or otherwise deform so that small sized pores are created.

For example, the material may drip from one layer to the next layer, creating a seal with the next layer. Thus creating two (or more) pores and finer porosity in the media. Deformation (e.g. dripping, drooping, etc.) may occur from the heat retained from the hot nozzle in the newest created layer and gravity. As a result, the previous laid layer may be attached to the new layer. The dripping layer that is perpendicular/not parallel to two parallel layers separated by a suitable distance may deform until it contacts the adjacent layer, creating two (or more) smaller pores on each side. In effect, this may create finer pore sizes for finer filtration. The desirable deformation may include adjusting the temperature control, control of layer height, extrusion width, infill pattern, etc.

A single layer of filtration media's debris holding capacity is typically limited by the number of flow passages through the media. As fluid passes through the media, debris larger than the passages will not be able to flow through the media and ultimately block the flow passage or become lodged in the media. To increase the capacity of a filter, media can also be layered and/or staggered so that larger debris can be stopped at a different depth than smaller debris. This results in an increase in media debris holding capacity. The prototypical media has a homogenous pore structure. This limits the capacity of the media because most of the debris stopped by the filter will happen near the surface which the contaminated fluid initially flows through.

In various embodiments of the filter media disclosed herein, a gradient within a stage of media and/or several staged media packs fabricated through additive manufacturing techniques may be provided. The media pack can consist of discrete media packs developed and synthesized from unique combinations of input settings in the additive manufacturing process. These settings selectively control the geometry of each stage in the media pack. Fabricating discrete and unique media packs in stages allows for the entire media pack to act as one continuous filtering element despite allowing for multiple stages of filtration as would be done using a filter in filter configuration or having multiple filters in series in a system. Unlike a filter in conventional filter design, adding additional stages does not necessarily result in a significant increase in part complexity and cost.

As a result, the contaminated flow will pass through each stage undergoing a different form of filtration to achieve a certain efficiency level. In some embodiments, the height of a layer is held constant with respect to that layer and is defined at a fixed distance from the layer that was just added to the part (printing at different layer heights at different heights of a printed part is something that is done to reduce print time.)

In some embodiments, a method varies the height of the layer as it is printed to create a single layer which is thicker in one area and thinner in another. The change in layer height with respect to depth in the media pack may result in a taper which creates a smaller pore size as the flow progresses downstream. This may increase the efficiency with respect to depth and prevents larger particles from passing further than an appropriate depth specific to that particle size. This may allow for better utilization of the volume occupied by the media pack and may increase the debris holding capacity. The tapers can also be nested, to further increase utilization of the media pack volume. The tapers which are nested, can either be the same dimensions so that it can function as a filter, or the tapers can have progressively smaller specifications that can increase the efficiency with respect to the stage within the media pack.

Filters and/or filter media discussed herein may be used to remove contaminants in any type of fluid, including hydraulic fluid, oil, fuel, etc. and may be used in any industry including earth moving, construction and mining, etc. As used herein, the term "filter" is to be interpreted to include "breathers" or any device used to remove contaminants from fluids as described anywhere herein. Also, any suitable industry as previously described herein that uses filters and/or breathers may use any of the embodiments discussed herein.

Focusing on FIGS. 1 thru 3, a filter with a filter center tube according to an embodiment of the present disclosure will be described. It should be noted that the filter in FIG. 1 has been sectioned to show the inner workings of the filter. Even though not completely shown, it is to be understood that that the filter would be a canister type filter and would form a hollow cylindrical enclosure in practice. Other components of the filter not specifically shown but is understood to be present include end caps, a top plate, etc. The center tube may be omitted in some embodiments because the filter may have more structural integrity since the filter may be manufactured with the filter media that is 3D printed manufactured using other additive manufacturing technology.

Figure 2:
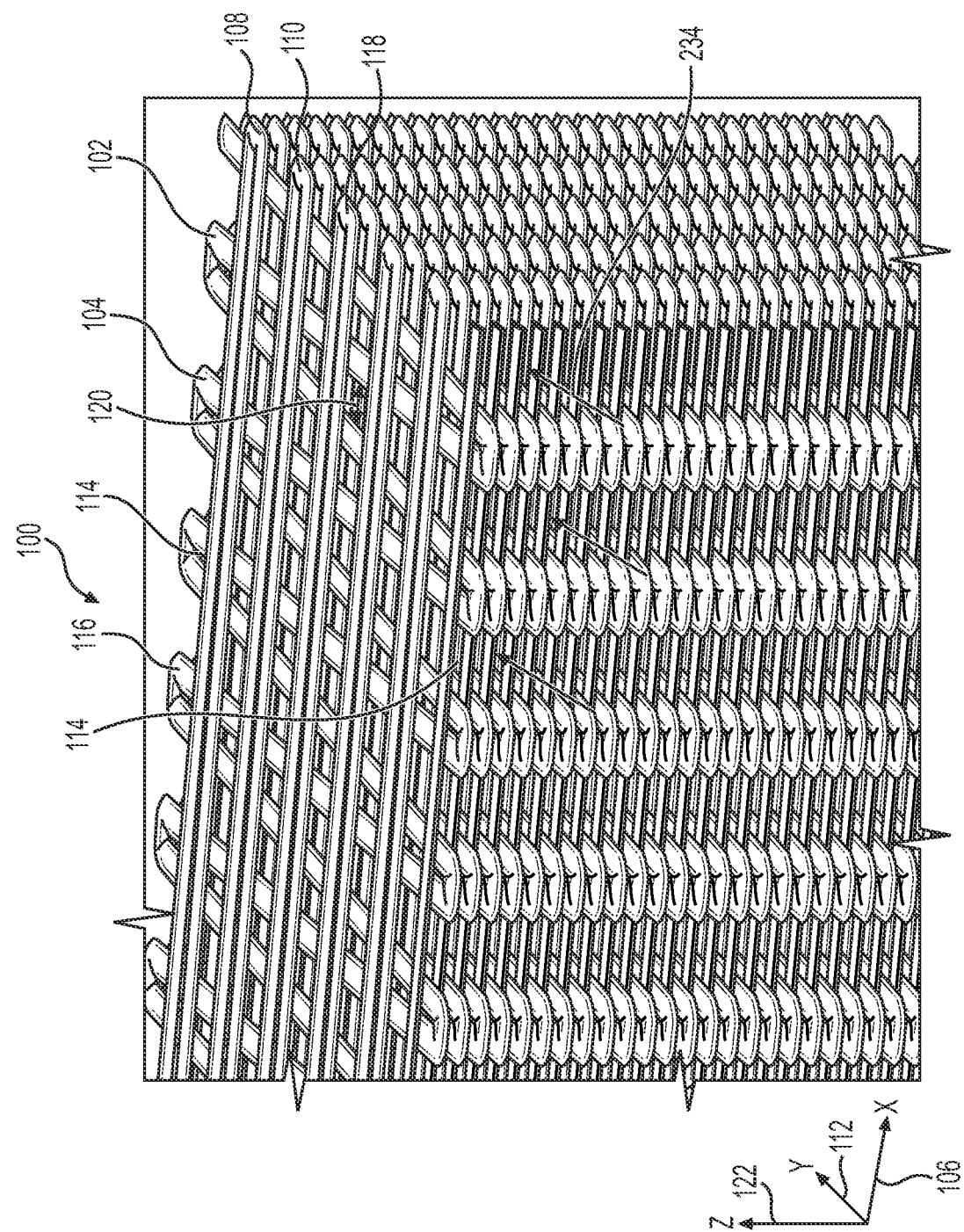
FIG. 2 is an enlarged perspective view of a portion of the filter center tube of FIG. 1, illustrating that the filter center tube is formed by forming layers of undulating strips of material that undulate in an alternating direction from one layer (X direction) to the adjacent layer (Y direction) along the Z direction.
Figure 3:
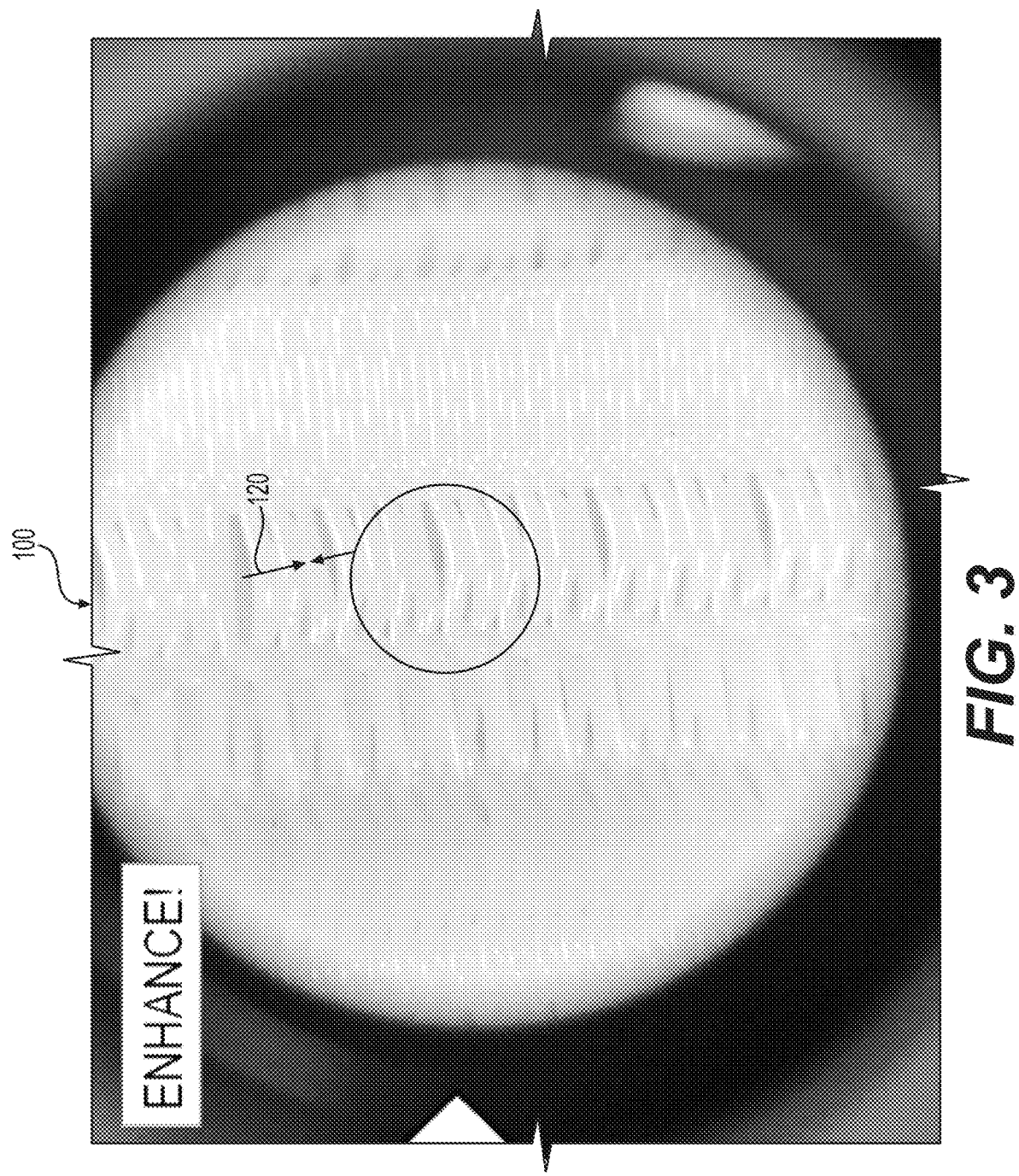
FIG. 3 is a side view of the center tube of FIG. 2 showing deformation (e.g. drooping) of the layers that may reduce the size of the pores formed between the layers.

With continued reference to FIGS. 1 thru 3, a filter center tube 100 according to an embodiment of the present disclosure may comprise a plurality of layers of solidified material including a first layer 102 with a first undulating strip 104 of solidified material extending in a first predetermined direction 106, and a second layer 108 with a second undulating strip 110 of solidified material extending in a second predetermined direction 112. The first layer 102 is in contact with the second layer 108 and the first predetermined direction 106 is not parallel with the second predetermined direction 112, forming a plurality of pores 114 therebetween.

In some embodiments, such as best seen in FIG. 2, the first predetermined direction 106 is perpendicular or tangential to the second predetermined direction 112 (other spatial relationships are possible). More particularly, the first undulating strip 104 of solidified material may have a trapezoidal pattern 116 and the second undulating strip 110 of solidified material may have a square pattern 118. Other patterns are possible in other embodiments. The trapezoidal pattern 116 at least partially defines a plurality of pores 114 each including a pore dimension 120 that decreases in size along the second predetermined direction 112. Likewise as best seen in FIG. 3, the filter center tube 100 may define a third predetermined direction 122 and the pore dimension 120 may vary in size along the third predetermined direction 122 such as when deformation happens to the layers (e.g. via dripping, drooling, etc.).

As alluded to earlier herein and best seen in FIG. 1, the filter center tube 100 may include a cylindrical annular configuration defining an outer annular region 124 and an inner annular region 126 and the plurality of layers 102, 108 contact each other define a plurality of pores 114 therebetween. Other configurations for the center tube 100 such as polygonal, cubic, etc. are possible for other embodiments.

A filter according to an embodiment of the present disclosure will now be discussed with reference to FIG. 1. The filter may be a canister style filter although other configurations and styles for other embodiments are possible. The filter 200 may comprise a housing 201 including an outer wall 202 and an inner wall 204, wherein the outer wall 202 and the inner wall 204 define the same longitudinal axis 206. The inner wall 204 defines a radial direction 208 that passes through the longitudinal axis 206 and that is perpendicular thereto, and a circumferential direction 210 that is tangential to the radial direction 208 and perpendicular to the longitudinal axis 206. The inner wall 204, which may be formed by the center tube 100 or formed integral with the housing 201, etc., is spaced radially inwardly away from the outer wall 202. The housing 201 may or may not be seamless.

The housing 201 may further define a first end 212 and a second end 214 disposed along the longitudinal axis 206 and a hollow interior 216. One or more inlets 218 may be provided that are in fluid communication with the hollow interior 216. Similarly, at least one outlet 220 may be provided that is in fluid communication with the hollow interior 216. For this embodiment, the outlet 220 may surround the longitudinal axis 206. A filter center tube 100 may disposed in the hollow interior 216 comprising a plurality of layers 102, 108, wherein each layer includes an undulating strip 104, 110 of solidified material as mentioned previously herein.

The filter center tube 100 may include an annular shape defining an outer annular region 124 and an inner annular region 126. Likewise, the hollow interior 216 may include an outer annular chamber 224 in fluid communication with the inlet 218 and the outer annular region 124 of the filter center tube 100. Also, the hollow interior 216 of the filter 200 may include a central cylindrical void 226 concentric about the longitudinal axis 206 that is in fluid communication with the outlet 220 and the inner annular region 126 of the filter center tube 100. The filter center tube 100 defines a plurality of pores 114 that may define a minimum dimension 120 that is less than 200 µm.

The filter 200 may further include a cylindrical annular configured filter media 228 disposed radially between the filter center tube 100 and the outer wall 202. The filter media 228 may include traditional filter media such as folded fabric having apertures 230. In other embodiments, the filter media is also manufactured using an additive manufacturing process such as 3D printing. In such a case, the filter center tube 100 may act as a secondary filter media while the outer filter media 228 may act as a primary filter media. In such a case, the apertures 230 of the filter media 228 may define larger sized dimensions compared to the pores 114 of the filter center tube 100. Fluid flow through the filter 200 is designated by arrows 234. The fluid flow may be reversed in other embodiments.

These various configurations, spatial relationships, and dimensions may be varied as needed or desired to be different than what has been specifically shown and described in other embodiments. For example, the pore size may be as big as desired or may be as small as desired. Also, the number and placement of the inlets and outlets may be varied as needed or desired in various embodiments.

As just mentioned, a plurality of filtering stages may be provided, so that larger sized contaminants are filtered out in the first stage by the first filter media 228, finer contaminants are filtered out in the second stage by the second filter media (i.e. the center tube 100), etc. As many filtering states as needed or desired may be provided in various embodiments (up to and including the $n^{th}$ stage). In other embodiments, the first filter media 228 may be configured to remove water, the second filter media 100 may be configured to remove debris, etc. In some embodiments, the first filter media 228 and the second filter media 100 are separate components that may be inserted into the housing 201. In such a case, the housing of the filter 200 is separate from the first filter media 228 and the second filter media 100. In other embodiments, the first filter media 228 and the second filter media 100 are integral with the housing 201 and each other, being built up at the same time as the housing 201 via an additive manufacturing process.

It should also be noted that various embodiments of a filter medium as described herein may be reused by backflushing captured debris or other contaminants from the filter medium.

In FIG. 1, a Cartesian coordinate system is provided showing that the first predetermined direction 106 may by the X direction, the second direction 112 may be the Y direction, and the third direction 122 may be the Z direction. Other coordinate systems and directions may be possible for other embodiments including polar, spherical, etc.

Any of the dimensions or configurations discussed herein for any embodiment of a filter media, filter center tube or filter or associated features may be varied as needed or desired. Also, the filter media, filter center tube or filter may be made from any suitable material that has the desired structural strength and that is chemically compatible with the fluid to be filtered. For example, various plastics may be used including, but not limited to PLA, co-polyesters, ABS, PE, Nylon, PU, etc.

INDUSTRIAL APPLICABILITY

In practice, a filter media, a filter center tube or a filter according to any embodiment described herein may be sold, bought, manufactured or otherwise obtained in an OEM (original equipment manufacturer) or after-market context (e.g. a replacement part).

Figure 4:
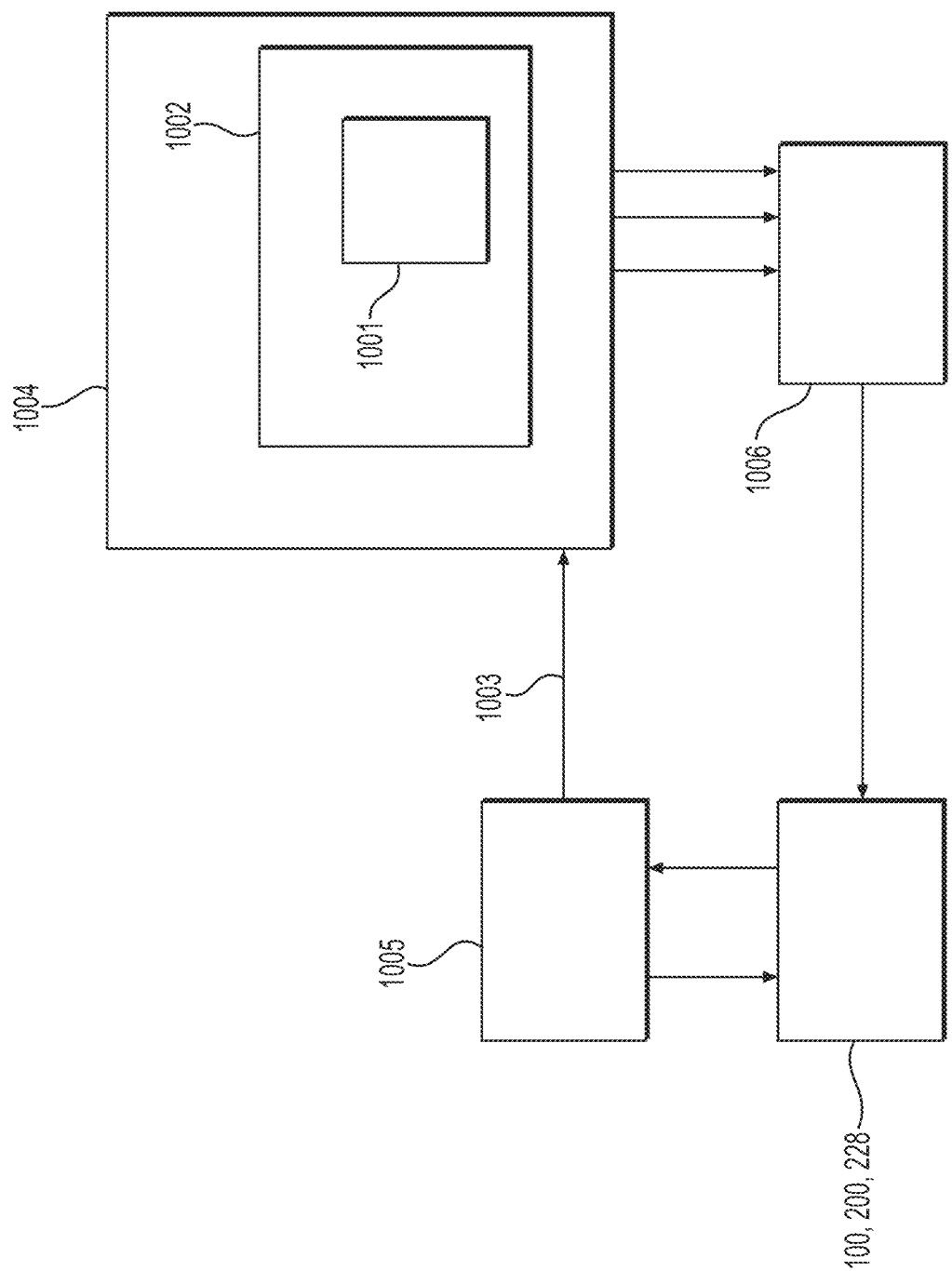
FIG. 4 is a schematic depicting a method and representing a system for generating a three-dimensional model of the filter center tube and/or filter medium according to any embodiment of the present disclosure.
Figure 5:
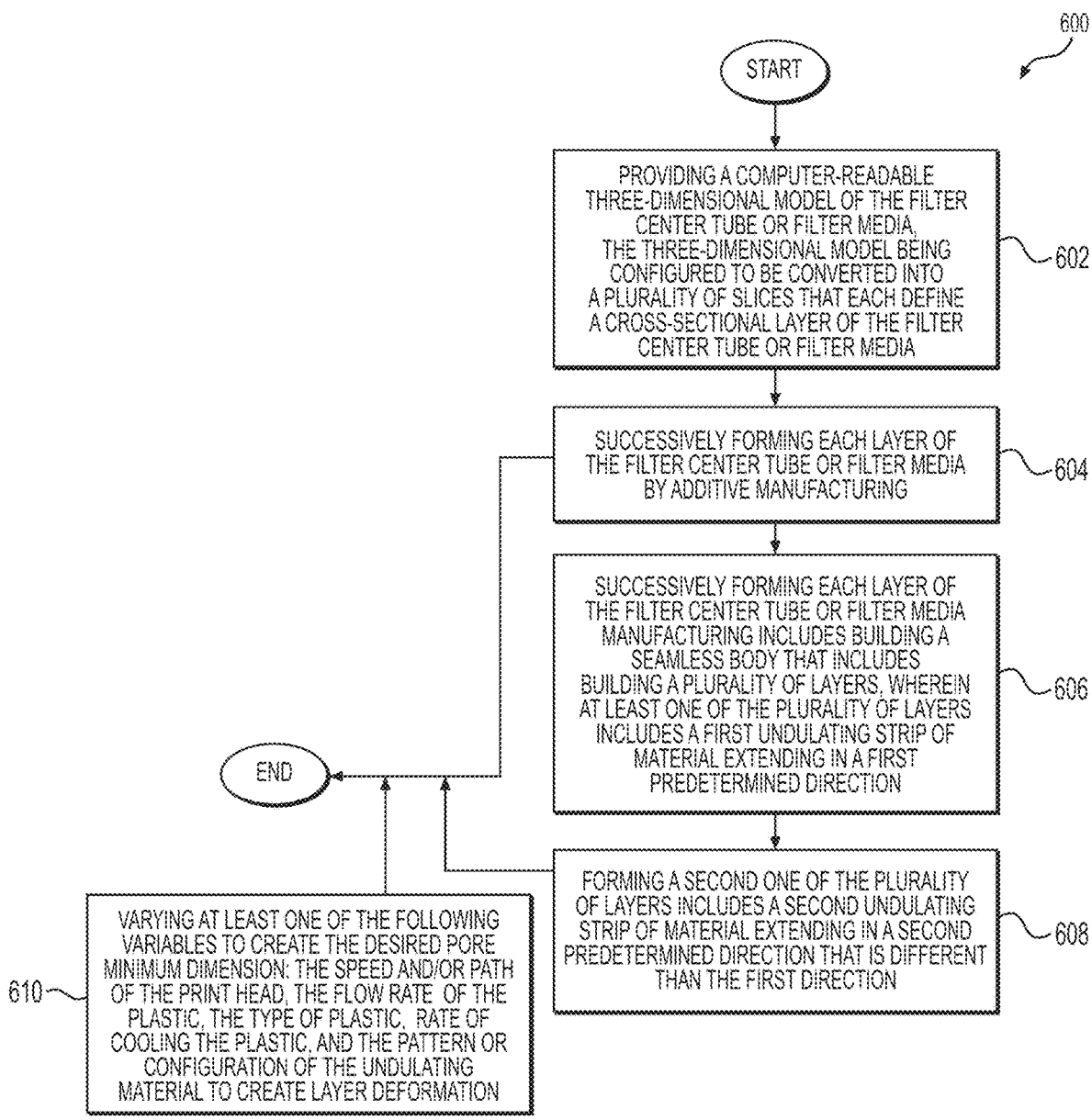
FIG. 5 is a flowchart illustrating a method of creating a filter center tube and/or a filter medium according to an embodiment of the present disclosure.

With reference to FIGS. 4 and 5, the disclosed filter media, filter center tubes and filters may be manufactured using conventional techniques such as, for example, casting or molding. Alternatively, the disclosed filter media, filter center tube and filters may be manufactured using other techniques generally referred to as additive manufacturing or additive fabrication.

Known additive manufacturing/fabrication processes include techniques such as, for example, 3D printing. 3D printing is a process wherein material may be deposited in successive layers under the control of a computer. The computer controls additive fabrication equipment to deposit the successive layers according to a three-dimensional model (e.g. a digital file such as an AMF or STL file) that is configured to be converted into a plurality of slices, for example substantially two-dimensional slices, that each define a cross-sectional layer of the filter, filter center tube or filter media in order to manufacture, or fabricate, the filter, filter center tube or filter media. In one case, the disclosed filter, filter center tube or filter media would be an original component and the 3D printing process would be utilized to manufacture the filter, filter center tube or filter media. In other cases, the 3D process could be used to replicate an existing filter, filter center tube or filter media and the replicated filter, filter center tube or filter media could be sold as aftermarket parts. These replicated aftermarket filters, filter center tubes or filter media could be either exact copies of the original filter, filter center tube or filter media or pseudo copies differing in only non-critical aspects.

With reference to FIG. 4, the three-dimensional model 1001 used to represent a filter center tube 100, a filter 200 or a filter media 100, 228 according to any embodiment disclosed herein may be on a computer-readable storage medium 1002 such as, for example, magnetic storage including floppy disk, hard disk, or magnetic tape; semiconductor storage such as solid state disk (SSD) or flash memory; optical disc storage; magneto-optical disc storage; or any other type of physical memory or non-transitory medium on which information or data readable by at least one processor may be stored. This storage medium may be used in connection with commercially available 3D printers 1006 to manufacture, or fabricate, the filter center tube 100, filter 200 or the filter media 100, 228. Alternatively, the three-dimensional model may be transmitted electronically to the 3D printer 1006 in a streaming fashion without being permanently stored at the location of the 3D printer 1006. In either case, the three-dimensional model constitutes a digital representation of the filter center tube 100, filter 200 or the filter media 100, 228 suitable for use in manufacturing the filter center tube 100, filter 200 or the filter media 100, 228.

The three-dimensional model may be formed in a number of known ways. In general, the three-dimensional model is created by inputting data 1003 representing the filter center tube 100, filter 200 or the filter media 100, 228 to a computer or a processor 1004 such as a cloud-based software operating system. The data may then be used as a three-dimensional model representing the physical the filter center tube 100, filter 200 or filter media 100, 228. The three-dimensional model is intended to be suitable for the purposes of manufacturing the filter center tube 100, filter 200 or filter medium 100, 228. In an exemplary embodiment, the three-dimensional model is suitable for the purpose of manufacturing the filter center tube 100, filter 200 or filter media 100, 228 by an additive manufacturing technique.

In one embodiment depicted in FIG. 4, the inputting of data may be achieved with a 3D scanner 1005. The method may involve contacting the filter center tube 100, filter 200 or the filter media 100, 228 via a contacting and data receiving device and receiving data from the contacting in order to generate the three-dimensional model. For example, 3D scanner 1005 may be a contact-type scanner. The scanned data may be imported into a 3D modeling software program to prepare a digital data set. In one embodiment, the contacting may occur via direct physical contact using a coordinate measuring machine that measures the physical structure of the filter center tube 100, filter 200 or filter media 100, 228 by contacting a probe with the surfaces of the filter center tube 100, filter 200 or the filter media 100, 228 in order to generate a three-dimensional model.

In other embodiments, the 3D scanner 1005 may be a non-contact type scanner and the method may include directing projected energy (e.g. light or ultrasonic) onto the filter center tube 100, filter 200 or the filter media 100, 228 to be replicated and receiving the reflected energy. From this reflected energy, a computer would generate a computer-readable three-dimensional model for use in manufacturing the filter center tube 100, filter 200 or the filter media 100, 228. In various embodiments, multiple 2D images can be used to create a three-dimensional model. For example, 2D slices of a 3D object can be combined to create the three-dimensional model. In lieu of a 3D scanner, the inputting of data may be done using computer-aided design (CAD) software. In this case, the three-dimensional model may be formed by generating a virtual 3D model of the disclosed filter center tube 100, filter 200 or the filter media 100, 228 using the CAD software. A three-dimensional model would be generated from the CAD virtual 3D model in order to manufacture the filter center tube 100, filter 200 or the filter media 100, 228.

The additive manufacturing process utilized to create the disclosed the filter center tube 100, filter 200 or the filter media 100, 228 may involve materials such as described earlier herein. In some embodiments, additional processes may be performed to create a finished product. Such additional processes may include, for example, one or more of cleaning, hardening, heat treatment, material removal, and polishing such as when metal materials are employed. Other processes necessary to complete a finished product may be performed in addition to or in lieu of these identified processes.

Focusing on FIG. 5, the method 600 for manufacturing a filter center tube or filter media according to any embodiment disclosed herein may comprise providing a computer-readable three-dimensional model of the filter center tube or the filter media, the three-dimensional model being configured to be converted into a plurality of slices that each define a cross-sectional layer of the filter center tube or filter media (block 602); and successively forming each layer of the filter center tube or filter media by additive manufacturing (block 604). Successively forming each layer of the filter center tube or filter media by additive manufacturing may include building a plurality of layers, wherein at least one of the plurality of layers includes a first undulating strip of material extending in a first predetermined direction (block 606).

Also, the method may comprise forming a second one of the plurality of layers including a second undulating strip of material extending in a second predetermined direction that is different than the first predetermined direction (block 608). Furthermore, the method may comprise varying at least one of the following variables to create the desired pore minimum dimension: the speed and/or path of the print head, the flow rate of the plastic, the type of plastic, rate of cooling of the plastic, and the pattern or the configuration of the undulating material to create layer deformation (block 610). The filter center tube or filter medium may be built from the bottom toward the top.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A filter center tube comprising:
   a plurality of layers of solidified material including a first layer with a first undulating strip of solidified material extending in a first predetermined direction; and a second layer with a second undulating strip of solidified material extending in a second predetermined direction;

wherein the first layer is in contact with the second layer and the first predetermined direction is not parallel with the second predetermined direction, forming a plurality of pores therebetween, and the first undulating strip of solidified material has a trapezoidal pattern with a pair of non-parallel legs, and the second undulating strip of solidified material has a square pattern with a pair of parallel legs.

2. The filter center tube of claim 1, wherein the first predetermined direction is perpendicular or tangential to the second predetermined direction.

3. The filter center tube of claim 2 wherein the trapezoidal pattern at least partially defines a plurality of pores each including a pore dimension that decreases in size along the second predetermined direction.

4. The filter center tube of claim 3 wherein the filter center tube defines a third predetermined direction and the pore dimension varies in size along the third predetermined direction.

5. The filter center tube of claim 2 wherein the filter center tube includes a cylindrical annular configuration defining an outer annular region and an inner annular region and the plurality of layers contact each other define a plurality of pores therebetween.

* * * * *